United States Patent [19]

Pickens, Jr. et al.

[11] 4,389,442
[45] Jun. 21, 1983

[54] WALL COVERING FABRIC WITH TEXTURIZED LOOPS

[75] Inventors: Robert C. Pickens, Jr., Gurnee; Patricia R. Kirchherr, Wonder Lake; Reese R. Thomas, Libertyville, all of Ill.

[73] Assignee: Ozite Corporation, Libertyville, Ill.

[21] Appl. No.: 329,648

[22] Filed: Dec. 10, 1981

Related U.S. Application Data

[63] Continuation of Ser. No. 159,471, Jun. 16, 1980, abandoned.

[51] Int. Cl.³ .......................... B32B 3/02; B32B 33/00
[52] U.S. Cl. ........................................ 428/92; 156/72; 428/93; 428/94; 428/95; 428/97
[58] Field of Search ................ 428/85, 92, 93, 94, 428/95, 97; 156/72

[56] References Cited

U.S. PATENT DOCUMENTS 3,867,243  2/1975  Stoller .................................. 428/85

Primary Examiner—Marion McCamish
Attorney, Agent, or Firm—Wood, Dalton, Phillips, Mason & Rowe

[57] ABSTRACT

A fabric (10), for a wall covering or the like, is provided which has a needled non-woven batt (16) of staple fibers (12), to a front surface or one face (18) of which a cloth or film of woven, knitted fabric or extruded film (22) is attached, as by needle punching fibers (12) from the batt, or the like. Groups of staple fibers are punched from the batt through the cloth or film (22) to produce a distinctive pattern of clustered loops (34) of non-woven fibers having a visual background of cloth or film (22). The back surface (20) of the non-woven batt may optionally be backed (40) as by fusing, latexing, or the like. A novel method of making a fabric is provided and comprises needling (15) the non-woven batt, attaching the cloth or film (22) to the batt, needling clustered loops (34,35) from the non-woven fibers of the batt through the cloth or film (22) to define a pattern of loops with the cloth or film (22) visible between the clustered loops, and optionally backing the non-woven batt. The fabric (10) has sound and heat insulating characteristics.

9 Claims, 8 Drawing Figures

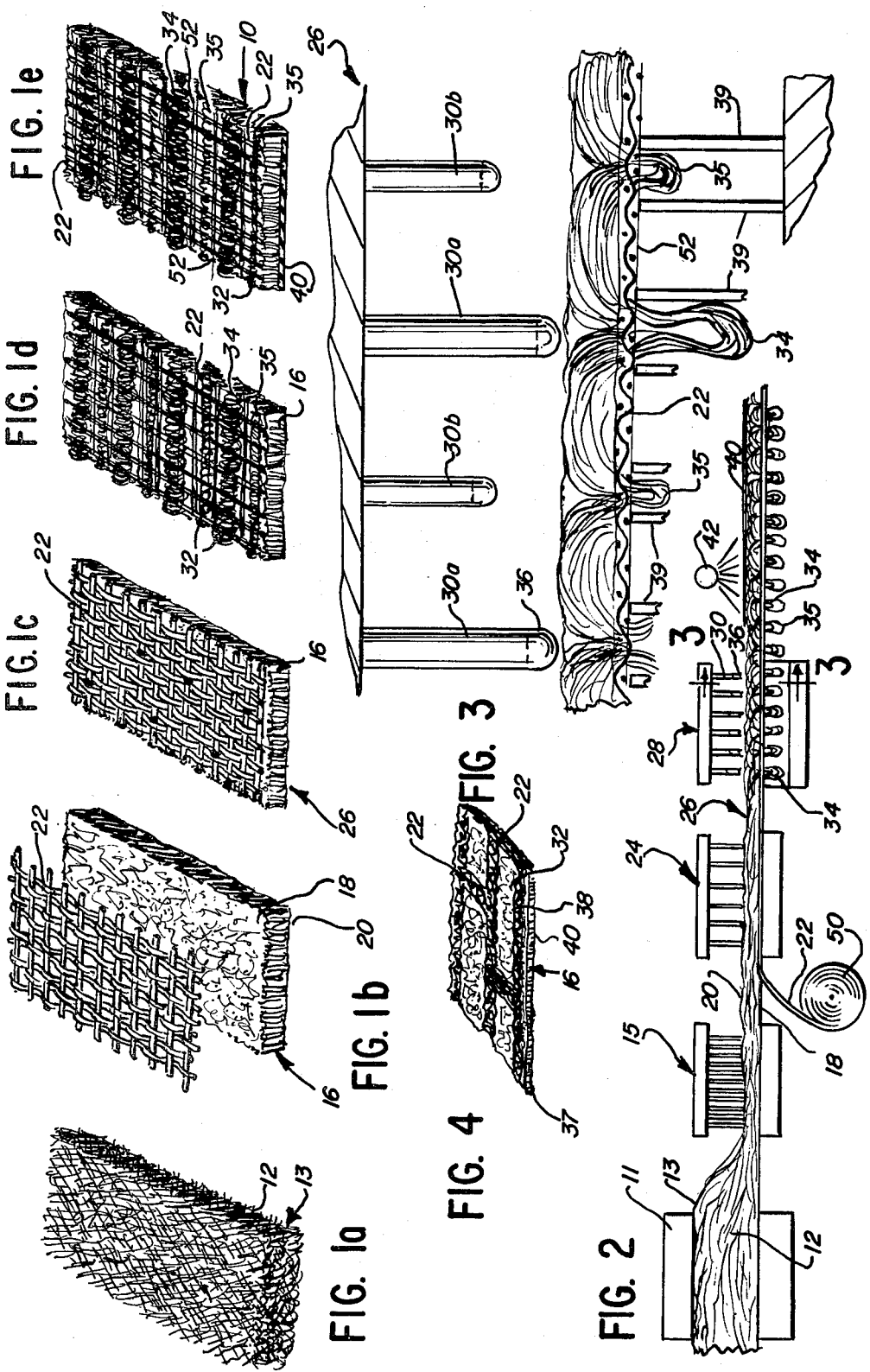

4,389,442

WALL COVERING FABRIC WITH TEXTURIZED LOOPS

This is a continuation of application Ser. No. 159,471, filed June 16, 1980, now abandoned.

TECHNICAL FIELD

This invention relates to a fabric and a method of making same and, in particular, to a fabric having a patterned surface of texturized loops with a visual woven, knitted fabric or extruded film background.

BACKGROUND ART

Fabrics for use as wall coverings, furniture coverings, art works, decorations, and the like, have been known for many years, the broadest form being printed fabrics that are used as wall or bed coverings. Tufted fabrics, such as those made by a needle point, hook, or latch process, have also been found attractive as wall decorations, furniture coverings, and for similar such uses. For actual wall coverings which are glued to the wall, grass cloth of adhesive-backed designer cloth are often used. The current wall covering fabrics are intended only as wall coverings where the current tufted fabrics, such as a hooked picture, are intended only as picture-like decorations. Neither the current wall coverings, nor the tufted fabrics affords any insulating effect for the wall and the room and are not applied in a way as to produce a patterned design effect.

In U.S. Pat. No. 3,819,465, issued June 25, 1974, in the name of Parsons et al., a non-woven textile product is disclosed wherein the visible surface of the textile is a series of arch-like ridges connected together to give a corrugated textured surface that can be used for automotive floor covering, upholstering and clothing.

The U.S. Pat. No. 3,347,736, issued Oct. 17, 1967, in the name of C. R. Sissons, shows a fabric made by needling through a batt of non-woven staple fibers upon which a hessian layer has been laid. The needling produced a high proportion of fibers oriented in a direction perpendicular to the plane of the hessian and extend through the hessian. Passing the needled hessian and batt through a boiling liquid dye causes the fibers to crimp and lead to an efflorescence of the tufts to produce mushroom-shaped structures. The mushrooming of the fibers produces a dense pile surface covering completely the hessian and base structure.

The Sudell U.S. Pat. No. 2,235,732, issued Mar. 18, 1941, shows fabric having a backing web, such as heavy duck, which is tufted in rows with the web in the spaces between the tufted rows being covered by abutting pile warps. The resulting fabric has the appearance of rows of adjacent tufts with a row of pile warps between the spaced rows of tufts with the backing web or duck completely covered.

U.S. Pat. No. 2,187,469 to Carragher, issued Jan. 16, 1940, U.S. Pat. No. 257,395 to Skinner, issued May 2, 1882, and U.S. Pat. No. 2,517,529 to Stanley, issued Aug. 1, 1950, show web or net-type backing materials with spaced tufts affixed thereto. In each patent the only backing is the web or net and the tufts are separate material applied independently thereto.

The present invention is directed to overcoming one or more of the problems as set forth above.

DISCLOSURE OF INVENTION

A fabric for use as a wall covering, upholstery, or the like, is comprised of a woven, knitted fabric or extruded film of material carried by a needled batt of non-woven staple fibers from which batt a texturized pattern of looped tufts are formed to project from said woven web. The texturized pattern may include rows of clustered loops which are spaced apart to visually reveal the woven, knitted fabric or extruded film as a background. When used as a wall covering, the non-woven batt of staple fibers is secured to a wall or surface as by the use of adhesives, or the like, and provides an insulating and sound-deadening material as well as providing a highly unique and decorative covering. The texturized clustered loops lie in the warp direction of a fabric and can be bunched or grouped in two or more closely spaced juxtaposed rows, if desired, with spacing between adjacent bunches or groups or patterns.

After needling the batt with the attached woven, knitted fabric or extruded film and texturizing the batt to form either rows or clustered loops or bunches of clustered loops with visual spacing therebetween, the product may be backed as by fusing, latexing, or the like. A unique method of making a finished fabric is provided using the steps enumerated.

BRIEF DESCRIPTION OF DRAWINGS

FIGS. 1(a) to 1(e) illustrate in perspective views successive stages of the manufacture of the fabric;

FIG. 2 illustrates a schematic fragmentary manufacturing line for practicing the method of the present invention to perform the various stages of manufacture of the fabric of FIGS. 1(a) to 1(e);

FIG. 3 is a greatly enlarged view of texturizing needles taken along the line 3—3 of FIG. 2, and FIG. 4 shows a finished fabric in the form of a brick.

BEST MODE FOR CARRYING OUT THE INVENTION

Referring to the drawings and in particular to FIGS. 1(a) to 1(e) and 2, the various stages in the manufacture of the improved fabric 10 of FIG. 1(e) are illustrated. Non-woven staple fibers 12 are processed in a conventional fashion to form a web of fibers which is then lapped in a conventional lapper 11 to form a continuous loose unneedled batt 13. The unneedled batt 13 is fed through a conventional needle punching machine 15 to form a batt 16 having on one side a front face surface 18 and on the other side a back surface 20. A sheet or strip of woven, knitted fabric or extruded film forming a decorative cloth or film 22 is laid on the face surface 18 of the needled batt 16 and is affixed or tacked thereto by the use of needle punching or the like. The woven fabric is a plain, leno, twill stain, baseketweave material or the like. The knitted fabric is a single or double knit, trico or the like material. The extruded film is a polyethylene or the like. FIG. 2 shows using a needle loom 24 to tack the decorative cloth or film 22 to the batt 16 to form the composite 26, shown in FIG. 1(c).

The composite 26 is passed through a texturizing needle loom 28 having the texturizing needles 30 spaced from each other in the cross machine direction of the composite 26 so that operation of the loom 28 on the composite 26 will produce spaced apart rows 32 of patterns of the texturized clustered loops 34 of non-woven staple fibers projecting outwardly in a transverse direction to the plane of the cloth or film 22. The decorative cloth or film 22 will be visible between the spaced rows or patterns of clustered loops 34. The needles 30 of the loom 28 have fork tips 36 which penetrate through the back surface 20 and pick up staple fibers 12 in the batt 16 and push said fibers through the decorative cloth or film 22 into the clustered loops 34. Two or more needles 30 may be closely adjacent each other to form a group of needles with each outside needle 30 of the group being spaced from an adjacent needle 30 or group of needles 30. The groups of needles will produce several side-by-side closely adjacent rows 32 or patterns of clustered loops 34 with no portions of the cloth or film 22 showing from between the rows or pattern of the individual group. The outer rows 32 of each group, being spaced from an adjacent row 32 of an adjacent group of rows 32, will visually expose portions of the cloth or film 22 therebetween. In this way a pattern such as a pattern of a brick wall 37 can be produced with the closely spaced rows 32 of a group 38 forming a brick with the cloth or film 22 showing between the groups 38 of rows 32 to represent the mortar between the bricks.

As shown in FIG. 3, the texturizing loom 28 has needles 30a which are long needles and needles 30b which are short needles. The rows of long and short needles 30a and 30b extend in the machine direction so as to punch rows of clustered loops 34 parallel to the machine direction. The long needles 30a will punch long loops 34 while the short needles will punch short loops 35 between the long loops 34. There is a space between the rows of long loops 34 and short loops 35 where the cloth or film 22 shows through. On each side of each parallel row of short needles 30b and long needles 30a are lamellas 39 which provide backing for the needles 30a and 30b and guide the formations of the rows of loops 34, 35.

By texturizing the batt of non-woven staple fibers, texturized loops are formed. By texturized loops is meant a plurality of clusters of loops of fibers formed from a batt of non-woven staple fibers where each cluster contains a plurality of different sized loops of fibers. The loops of each cluster are formed by a forked needle open in the cross-machine direction so that the loops of each cluster will have openings generally aligned in the machine direction. As will be apparent in FIG. 1(d) and in FIG. 2, at loom 28, a plurality of rows of clusters of loops will be formed simultaneously in the machine direction with spacing between selected rows in which spacing the cloth or film is visible.

Optionally, the texturized fabric may have a backing 40 added on the back surface 20 of the batt 16 as by fusing, latexing or the like to stiffen the fabric and to anchor or secure the loops 34, 35 and fibers 12 of the batt 16 together. As shown in FIG. 2, a spray applicator 42 sprays latex or the like on to the back surface 20 of the backing 40. A heated roller could be substituted for the applicator 42 to fuse the fibers 12 in proximity thereto together to form backing 40. The backing 40 adds a degree of stiffness and body to the fabric to aid in handling the fabric. When, for instance, the fabric is used as a wall covering, the mastic or other adhesive for attaching the fabric to the wall grips the backing 40 to hold the fabric to the wall. The backing 40 may also be in the form of a scrim or sheet material or the like, needle bonded to the batt.

The finished fabric 10 may be used in a conventional width form or may be cut into geometric shapes which are then fit together and secured to a base to form a pattern or design. The base with the design can be mounted in a frame or can be separately hung or fastened to a surface.

EXAMPLE 1

A 20 denier solution dyed, polypropylene staple fiber of approximately 3" lengths are processed and needled into a batt 16 using 700 punches per square inch. The cloth or film 22 was fed from a roll 50 continuously onto the front surface 18 of the batt 16 after which the cloth or film 22 and batt 16 were passed through a needle punch 24 to tack the cloth or film 22 to the batt to form the composite member 26. The composite member 26 was moved from the needle punch 24 to a texturizing needle loom 28, where the composite 26 was texturized by punching fibers from the batt 16, into rows 32 of long loops 34 spaced from rows of short loops 35 to give a pin-stripe pattern to the fabric with the cloth or film 22 showing between the rows 32. The long clustered loops 34 in one row 32 are spaced from the short clustered loops 35 with the cloth or film 22 showing therebetween. The spaces 52 between the rows of loops 34 and rows of loops 35 are where the cloth or film 22 is visible forming an interesting, highly useful finished fabric. The texturized fabric was fed from the texture needle loom 28 directly to a backing applying apparatus 42, in this case a spray applicator, wherein the back surface 20 of the fabric was coated with latex to form the backing 40. The finished fabric has sound deadening characteristics as well as heat insulating characteristics which when used as a wall covering produces highly desirable results. The fabric can be applied with the patterns oriented in different directions so as to provide an aesthetic as well as utilitarian effect.

Other aspects, objects and advantages of this invention can be obtained from a study of the drawings, the disclosure and the appended claims.

We claim:

1. A fabric comprising:
   a needled batt of non-woven staple fibers,
   a cloth or film of woven, knitted or extruded film needled punched to a face surface of said batt, and
   texturized loops of staple fibers are formed from the staple fibers of said batt and extend from said batt outwardly through said cloth or film,
   the texturized loops of fibers are comprised of a plurality of clusters of loops of fibers with each cluster containing a plurality of different sized loops of fibers,
   said clusters of loops are formed in a pattern on said cloth or film with spaces between selected clusters of loops through which spaces said cloth or film is visible.

2. A fabric as claimed in claim 1 wherein a backing means is applied on a back surface of said batt for securing the fibers of said clusters of loops to the fibers of said batt.

3. A fabric comprising:
   a needled batt of non-woven staple fibers having a face surface and a back surface,
   a cloth or film of woven, knitted fabric or extruded film is needle punched to said face surface of said batt,
   texturized loops of staple fibers are formed from the fibers of said batt and extend from said batt outwardly through said cloth or film,
   said texturized loops of fibers being comprised of a plurality of clusters of loops of fibers with each cluster containing a plurality of different sized loops of fibers, said clusters of loops being formed in rows in the machine direction on said cloth or film with spaces between selected rows of clusters of loops through which spaces said cloth or web is visible, and backing means on the back surface of said batt and penetrating into said batt for securing said fibers of said clusters of loops to the fibers of said batt and for stiffening said fabric.

4. A fabric as claimed in claim 3 wherein said rows of clusters of loops are in spaced apart relationship with said cloth or film visible between the rows.

5. A fabric as claimed in claim 4 wherein selected ones of said rows have long clustered loops and other selected ones of said rows have short clustered loops to produce pin-stripe configuration.

6. A method of manufacturing a fabric comprising:
lapping and needling non-woven staple fibers into a batt, laying a cloth or film of woven, knitted or extruded film onto a face surface of said batt, tacking said cloth or film to the said face surface of said batt, and texturizing spaced portions of said non-woven fibers of said batt to form clusters of loops of non-woven fibers projecting from said batt and from said cloth or film with portions of said cloth or film remaining visible between said clusters of loops.

7. A method of manufacturing a fabric as claimed in claim 6 wherein a backing is applied to a back surface of said batt to secure said staple fibers of said clusters of loops to the fibers of said batt.

8. A method of manufacturing a fabric comprising:
lapping and needling non-woven staple fibers into a batt having a face surface and a back surface thereon, laying a cloth or film of woven, knitted or extruded film onto the face surface of said batt, needle punching said cloth or film to said face surface of said batt, texturizing spaced portions of said non-woven fibers of said batt to form clusters of loops of non-woven fibers projecting from said cloth or film with portions of said cloth or film remaining visible between said clusters of loops, and applying a backing to the back surface of said batt for securing said staple fibers of said clusters of loops to the fibers of said batt.

9. A method of manufacturing a fabric as claimed in claim 8 wherein said texturizing forms clusters of loops in spaced apart rows with said cloth or film visible between the rows.

* * * * *